T. M. BUTLER.
TORCH HOLDING AND GUIDING MEANS.
APPLICATION FILED SEPT. 30, 1915.
1,238,257.
Patented Aug. 28, 1917.
2 SHEETS—SHEET 2.
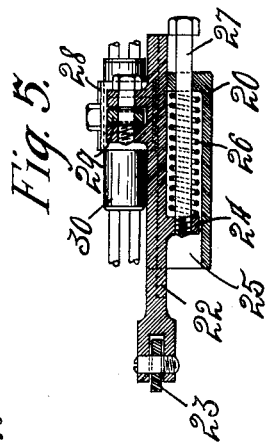
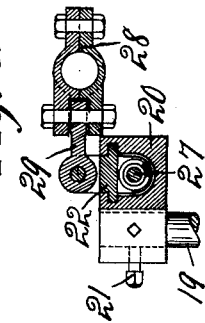
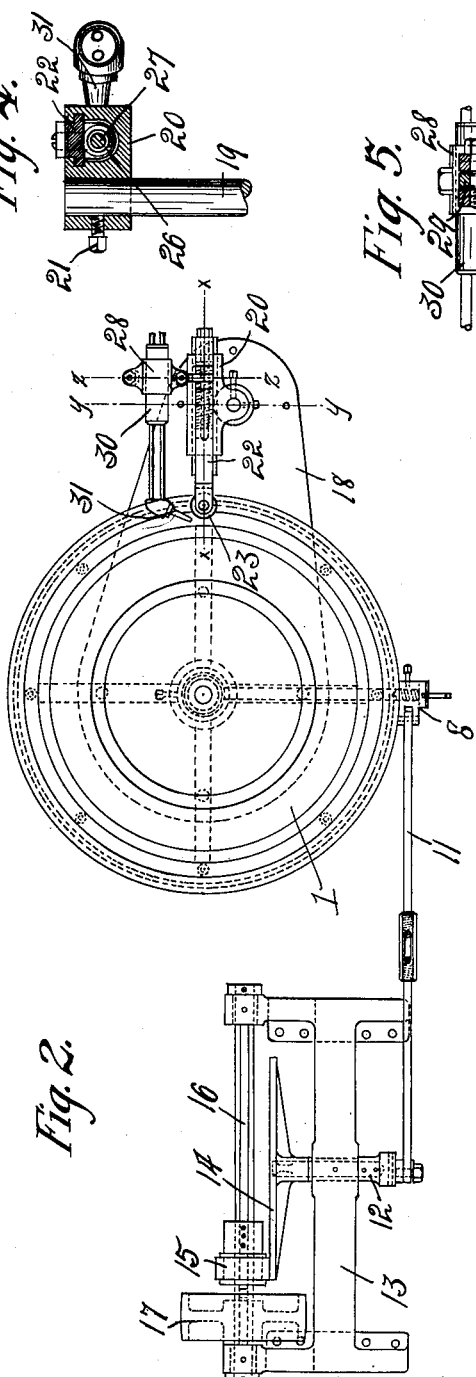
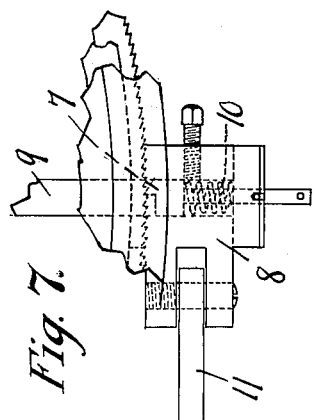

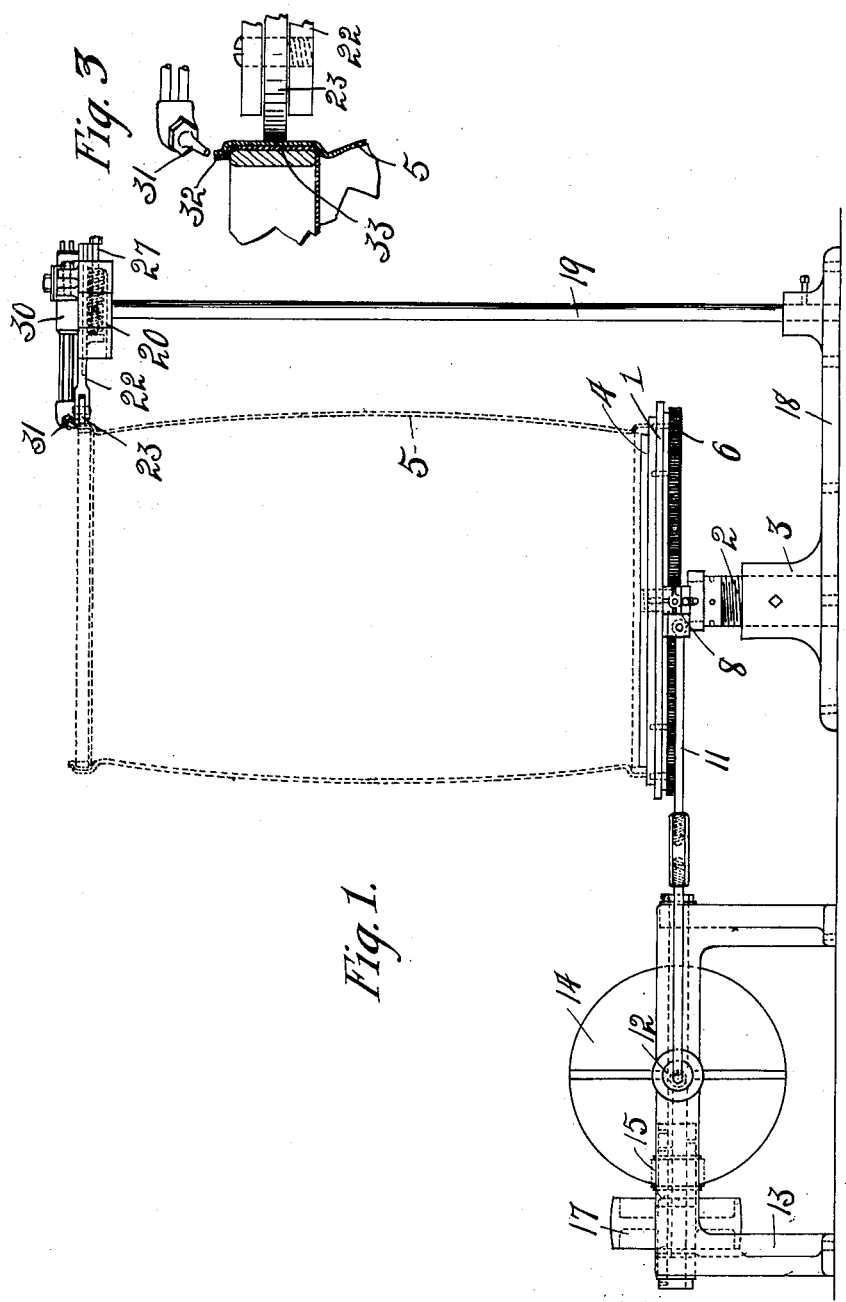

UNITED STATES PATENT OFFICE.

THOMAS M. BUTLER, OF TOLEDO, OHIO, ASSIGNOR TO CHARLES H. WACKER, OF CHICAGO, ILLINOIS.

TORCH HOLDING AND GUIDING MEANS.

1,238,257.      Specification of Letters Patent.     Patented Aug. 28, 1917.

Application filed September 30, 1915. Serial No. 53,439.

*To all whom it may concern:*

Be it known that I, THOMAS M. BUTLER, a citizen of the United States, and a resident of Toledo, in the county of Lucas and State of Ohio, have invented a certain new and useful Torch Holding and Guiding Means; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to joint welding means, and has for its primary object the provision of simple and efficient means for uniformly welding together the edges of the head and body of a metallic barrel or similar receptacle at the chime thereof. Further objects and advantages of the invention will be apparent from the following detailed description thereof.

While the invention in its broader aspect is capable of embodiment in numerous forms, a preferred embodiment thereof is illustrated in the accompanying drawings, in which,—

Figure 1 is a side elevation of a machine embodying the invention. Fig. 2 is a top plan view thereof. Fig. 3 is a large detail of a portion of the welding means in guiding engagement with the chime of a barrel being welded. Figs. 4, 5 and 6 are enlarged sections on the dotted lines $y$, $y$, $x$, $x$ and $z$, $z$ in Fig. 2, and Fig. 7 is an enlarged plan of the ratchet drive for the rotatable work table.

Referring to the drawings, 1 designates a work supporting table, which is rotatably mounted in any suitable manner on a center standard 2, which standard preferably has a screw adjustment in a base socket 3 to permit a vertical adjustment of the table if desired. The table 1 is preferably provided on its top adjacent the edge thereof with a plurality of stepped annular shoulders 4 for fitting into the chimes of barrels 5 of different sizes and centering the barrel with respect to the table. The table 1 is provided at its under side adjacent to its periphery with a ratchet wheel 6 with which a pawl 7 is adapted to engage. The pawl 7 is mounted in a block 8 for reciprocatory movements relative thereto radially of the table and said block is carried at the outer end of a swinging arm 9, which is pivotally mounted at its inner end in concentric relation to the table 1, thus permitting the block 8 to have swinging movements in concentric relation to the ratchet-wheel 6. The pawl 7 is urged into engagement with the ratchet teeth by a spring 10, which is mounted within the block 8 at the outer side of the pawl and bears inward thereagainst.

A rod 11 is pivoted loosely at one end to the block 8 and has its other end eccentrically connected to a shaft 12, which is horizontally mounted, in the present instance, in a bearing standard 13 at one side of the table 1, thus causing the shaft 12, when rotated, to impart slight reciprocatory movements to the block 8 and a consequent intermittent rotary movement to the table 1. The shaft 12 is preferably friction driven, and for such purpose is provided at one end with a friction disk 14 with which a friction drive-wheel 15 engages, said wheel being axially shiftable on a drive shaft 16. The shaft 16 is mounted in suitable bearings in the standard 13 and, in the present instance, carries a belt pulley 17 to which power may be communicated from any suitable source.

Rising at one side of the table 1, from a base 18, or other suitable support, is a standard 19, which is provided at its upper end with a vertically adjustable head-block 20, which is provided with a set-screw 21 for securing it in fixed relation to the standards. A guide-arm 22 is mounted on the block 20 for horizontal reciprocatory movements relative thereto and has one end projecting over the adjustable edge of the table 1 and provided with an anti-friction roll 23, which is provided with a vertical axis and is adapted to have rolling contact with the outer peripheral surface of the upper chime of a barrel 5 mounted on the table, as indicated in Figs. 1 and 3. The arm 22 has a lug 24 projecting downward therefrom within an elongated recess 25 in the block 20, and disposed between this lug and an end wall of the recess is a coiled compression spring 26, which urges the arm 22 to have inward movements toward the axis of the table 1. A stop rod 27 projects from the arm lug 24 through the outer end of the block 20 and coacts therewith to limit the inward spring urged movement of the arm.

A pair of clamping members 28 are carried by the arm 22 at the upper side thereof adjacent to its outer end and have universal connection therewith as through a double pivoted link 29 to permit a swinging of the clamp members in different directions relative to the arm. The body portion 30 of a torch is intended to be clamped by the clamping members 28 in suitable position for the nozzle 31 of the torch to direct its flame against the chime edge 32 of a barrel whereby to effect a welding together of the separate members of such edge, which members, in the present instance, comprise the edge of the head flange 33 and the outer end edge of the barrel body 5, as best shown in Fig. 3.

It is evident in the operation of my welding device that slow intermittent rotary movements are imparted to the table 1 and barrel 5 and that the roller 23 at the end of the guide-arm 22 travels on the outer peripheral side of the upper chime and maintains the torch nozzle 31 in constant position with respect to the chime edge due to the torch being fixed to the guide-arm 22 and the guide arm moving in and out in accord with any irregularities in the chime, so that the torch flame will be constantly directed in predetermined position against the chime edge, thereby effecting a uniform welding of such edge irrespective of any irregularities in the circular form in such edge. In practice it is preferable to provide two or more torches and their guiding arms at different positions around the chime so as to effect a more rapid welding than would be the case if only one torch was used. As the number of torches employed form no part of the present invention one only is illustrated.

It will be understood that the speed of rotary movement of the table is adjusted to suit the welding action of the torch flame.

This invention is of considerable importance in the manufacture of steel barrels as it imparts a more perfect and uniform welding to the chime than can be accomplished by hand and the guide arm feature thereof causes it to follow any irregularities in the circular formation of the chime so that the welding flame is directed in proper predetermined position alike on all points of the chime edge.

I wish it understood that my invention is not limited to any specific construction, arrangement or form of the parts as it is capable of numerous modifications, and changes in the different parts and arrangement thereof without departing from the spirit of the claims.

Having thus described my invention, what I claim as new, and desire to secure by Letters Patent, is,—

1. A rotatable work support, a torch for directing a welding flame against the chime edge of a work piece carried by the support, and means carrying said torch and coacting with the work piece to guide the movements of the torch with respect thereto.

2. A rotatable work support, a torch for directing a welding flame against a circular part of a work piece carried by and rotatable with said support, and means carrying said torch and coacting with the work piece when rotated to guide the torch to maintain it in predetermined adjustment with respect to the adjacent portion of the work piece.

3. A movable work support, a torch for directing a welding flame against a portion of the work piece carried by the support, and movable means carrying said torch and coacting with the work piece to guide the movements of the torch to maintain it in constant predetermined adjustment with respect to the adjacent portion of the work piece.

4. A movable work support, a torch for directing a flame against a part of a work piece carried by the support, which part changes its position with respect to the torch when the work piece is moved, guide means mounted at one side of a work piece carried by the support, said means carrying said torch and coacting with the workpiece to control the position of the torch with respect to the work piece part against which the torch flame is directed.

5. A movable work support, a torch for directing a welding flame against a part of a work piece carried by said support, guide means adjustably and movably mounted at one side of said support, said means carrying said torch and coacting with the work piece carried by the support to maintain the torch in constant position with respect to the adjacent portion of the work piece against which its flame is being directed.

6. A movable work support, a torch for directing a flame against a part of a work piece carried by the support, a standard disposed at one side of the support, a guide member movably carried by said standard and bearing against a part of a work piece carried by the support, said torch being carried by said member and being guided by movements of the member to maintain the torch in predetermined adjustment with respect to the part of the work piece against which its flame is directed.

7. A movable work support, means for imparting predetermined movements to said support, a torch for directing a flame against a part of a work piece mounted on said support, a yieldingly movable guide member carrying said torch and bearing against a portion of a work piece on the support, said member being adapted to move as it follows irregularities in shape of the portion of the work piece against which it bears and to communicate corresponding movements to the torch.

8. A movable work support, means for imparting predetermined movements to said support, a torch mounted for movements relative to the support and having a guide part for coacting with a work piece on the support whereby said torch will be moved by irregularly shaped parts on the portion of the work piece with which the guide part of said torch has contact.

9. A movable work support, a torch for directing a flame against a portion of the work piece carried by said support, a guide member mounted at one side of said support and carrying said torch, said guide member having yielding inward bearing contact against a side of a work piece carried by the support whereby irregularities in the shape of the portion of the work piece against which the support bears are compensated for by consequent movements of the guide member and torch.

10. A movable work support, a bearing head mounted at one side of said support, a guide member carried by said head for yielding movements relative thereto and being urged to have bearing contact against a portion of a work piece carried by said support whereby the bearing member is caused to move as it encounters irregularities in the work piece, and a torch carried by said member for movements therewith and disposed to direct a flame against a portion of the work piece carried by said support.

11. A movable work support, a bearing head mounted adjacent to said support, a guide arm movably carried by said bearing head, means coacting with said bearing head and arm to urge the arm against the work piece carried by said support, a torch adjustably carried by said arm for directing a flame against a part of a work piece carried by said support, said torch being guided by said arm as it moves inward and outward upon encountering irregularities in the portion of a work piece against which it bears.

12. A rotatable work support, a bearing head mounted for vertical adjustment adjacent to a side of said support, a guide arm movably carried by said head, means urging a movement of said arm toward the axis of said support whereby the inner end of the arm is caused to ride against a registering portion of a work piece mounted on the support, said arm moving inward and outward in accord with irregularities encountered in the shape of the work piece, and a torch carried by and movable with said arm and having its nozzle disposed to direct a flame against a portion of a work piece carried by said support.

13. In combination, a rotatable work support, drive means having pawl and ratchet connection with said support and operable to impart intermittent movements thereto, a bearing head mounted for vertical adjustment at one side of said support, a guide arm movably carried by said head for movements toward and away from a work piece carried by said support, a roller at the inner end of said arm for riding against a registering portion of a work piece on the support, means urging a movement of the arm toward an engaged work piece whereby the arm has inward and outward movements in accord with irregularities encountered in the work piece, and a torch adjustably carried by said arm for movements therewith and having its nozzle disposed to direct a flame against a portion of a work piece carried by the support and with which the arm has contact.

In testimony whereof, I have hereunto signed my name to this specification.

THOMAS M. BUTLER.